United States Patent [19]

Hasegawa et al.

[11] Patent Number: 5,585,984
[45] Date of Patent: Dec. 17, 1996

[54] MAGNETIC HEAD

[75] Inventors: Naoya Hasegawa; Fumihito Koike; Atsumi Nitta, all of Nagaoka, Japan

[73] Assignee: Alps Electric Co., Ltd., Tokyo, Japan

[21] Appl. No.: 305,226

[22] Filed: Sep. 13, 1994

[30] Foreign Application Priority Data

Sep. 16, 1993 [JP] Japan .................. 5-230555

[51] Int. Cl.$^6$ ............................... G11B 5/127
[52] U.S. Cl. .................. 360/113; 360/119; 360/120; 360/126; 428/212; 428/323; 428/328; 428/692; 428/900
[58] Field of Search ................. 360/113, 119, 360/120, 126; 428/212, 323, 328, 692, 694 R, 900

[56] References Cited

U.S. PATENT DOCUMENTS

| | | | |
|---|---|---|---|
| 4,755,899 | 7/1988 | Kobayashi et al. | 360/125 |
| 4,894,742 | 1/1990 | Saito et al. | 360/126 |
| 4,918,555 | 4/1990 | Yoshizawa et al. | 360/125 |
| 5,019,190 | 5/1991 | Sawa et al. | 148/306 |
| 5,238,507 | 8/1993 | Kugimiya et al. | 148/307 |
| 5,245,488 | 9/1993 | Iwamoto et al. | 360/119 |
| 5,252,148 | 10/1993 | Shigeta et al. | 148/307 |
| 5,262,915 | 11/1993 | Terunuma et al. | 360/120 |
| 5,421,915 | 6/1995 | Nakanishi et al. | 148/304 |
| 5,432,645 | 7/1995 | Terunuma et al. | 360/126 |

FOREIGN PATENT DOCUMENTS

| | | |
|---|---|---|
| 4-16553 | 1/1992 | Japan . |
| 4-49604 | 2/1992 | Japan . |

*Primary Examiner*—Stevan A. Resan
*Attorney, Agent, or Firm*—Guy W. Shoup; Patrick T. Bever

[57] ABSTRACT

There is disclosed a magnetic head including a magnetic film deposited on a substrate, being characterized in that: the the magnetic film is made of a soft magnetic alloy having an average coefficient of linear thermal expansion in the range from $125\times10^{-7}$ to $150\times10^{-7}$/°C. over the temperature range from room temperature to 600° C., a saturation magnetostriction constant in the range from 0 to $+3\times10^{-6}$, and a mean crystal grain size less than 30 nm; and the portion of the substrate adjacent to the magnetic core has an average coefficient of linear thermal expansion in the range from $115\times10^{-7}$ to $145\times10^{-7}$/°C. over the temperature range from room temperature to 600° C., thereby providing a high permeability, low coercive force, and excellent resistance to corrosion.

8 Claims, 8 Drawing Sheets

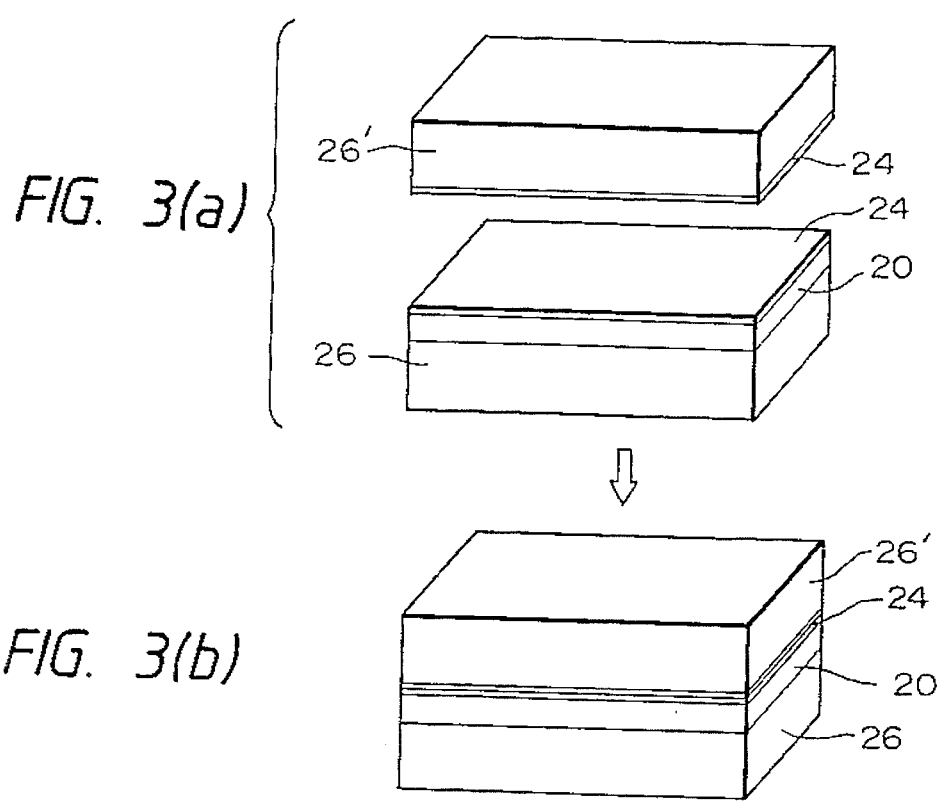
FIG. 3(a)
FIG. 3(b)
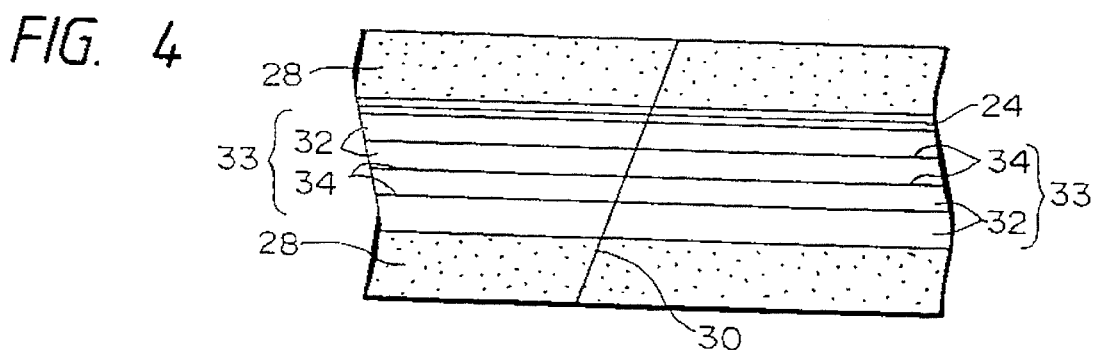
FIG. 4

BEFORE SANDWICHED

AFTER HEAT-TREATED AT 700°C FOR 20 MIN

AFTER SANDWICHED

BEFORE SANDWICHED

AFTER HEAT-TREATED AT 700°C FOR 20 MIN

AFTER SANDWICHED

BEFORE SANDWICHED

AFTER SANDWICHED

AFTER HEAT-TREATED AT 700°C FOR 20 MIN

MAGNETIC HEAD

BACKGROUND OF THE INVENTION

1. Field of the Invention

The present invention relates to a magnetic head for performing recording/reproducing of information, for use in a magnetic recording apparatus such a VTR or a magnetic storage device of a computer. In particular, the present invention relates to a laminated magnetic head having a magnetic core including at least one layer of magnetic film sandwiched between substrates, and to a metal-in-gap magnetic head having a magnetic film disposed near a magnetic gap.

2. Description of the Related Art

In recent years, to increase the magnetic recording density, a recording medium having high coecive force has been developed. Thus, it is required to develop a high-performance magnetic head suitable for use in conjunction with such a medium having high coercive force.

To achieve higher recording density, it is desirable to reduce the track width and the gap length of a magnetic head, and also desirable to reduce the coercive force of the magnetic head while maintaining a high saturation flux density and a high permeability.

Recently, in view of the above, a metal-in-gap magnetic head has come to be used practically. In this type of magnetic head, a metallic magnetic film is disposed near a magnetic gap of a magnetic core of ferrite or the like.

To achieve better magnetic characteristics in a high frequency range, there has also been developed a laminated magnetic head having a small track width and having high resistivity thereby reducing eddy-current loss.

In a laminated magnetic head, a magnetic film is deposited on a substrate using a sputtering or evaporation technique, and another substrate is then bonded to the deposited magnetic film thereby producing a magnetic core sandwiched between substrates. In this case, the thickness of the deposited magnetic film defines the track width. Therefore, it is easy to obtain a small track width and thus it is possible to improve the recording density and to prevent the interference with neighboring tracks.

Furthermore, because the magnetic circuit is formed with a thin magnetic film having a thickness of a few µm, the eddy-current loss is reduced and the performance of the magnetic head in a high frequency range is improved.

FIG. 1 illustrates an example of a laminated magnetic head for use in a hard disk storage device of a computer.

The magnetic head 10 shown in FIG. 1 generally comprises: a slider 14 including a pair of air bearing rails 16, 16 disposed parallel to each other; a core portion 18 formed at an end of one of floating rails; and a magnetic core 20, in which the magnetic core 20 is disposed between substrates including the slider 14 and the core portion 18. FIG. 2 is an enlarged view of a portion designated by A in FIG. 1. A magnetic film 20' is sandwiched between substrates 14' and 14" which are also parts of the slider, and a magnetic film 20" is sandwiched between substrates 18' and 18" which are also parts of the core portion 18, wherein the magnetic films 20' and 20" form the magnetic core 20. There is a non-magnetic material forming a magnetic gap 22 between the slider 14 and the core portion 18. There is also adhesive glass 24 between one face of the magnetic core 20 and the substrates 14" and 18" wherein the magnetic core 20 is bonded to the substrates 14" and 18" via the adhesive glass 24.

Such adhesive glass for connecting a magnetic core and a substrate will be referred to as laminate glass hereafter in this invention.

The core portion 18 further includes a coil (not shown) wound around the core portion 18 to form a magnetic head.

In operation of the magnetic head for a hard disk storage device shown in FIG. 1 or 2, the magnetic gap 22 runs floating at a very small height over a magnetic hard disk thereby performing magnetic recording or reproducing.

A magnetic head of this type is produced as follows. First, as shown in FIG. 3, a magnetic film 20 is formed on one side face of a block-shaped substrate 26. Then, laminate glass 24 is coated on the magnetic film 20, and another substrate 26' is placed on it. These substrates are pressed against each other at a high temperature thereby bonding them together. In this bonding process, another laminate glass 24 may also be coated on the substrate 26' as required.

The assembled block is cooled down to room temperature to solidify the laminate glass. The block is then cut and polished so as to separately produce a plurality of sliders and cores having desired shapes.

A slider and a core which have been produced separately are positioned such that both sandwiched magnetic films 20 may make good continuity, and non-magnetic adhesive glass 21 is filled into upper portions of winding holes so as to make bond at the magnetic gap. In this way, a magnetic head 10 such as that shown in FIG. 1 is complete. Hereafter in this invention, this bonding process will be referred to as gap bonding, and the adhesive glass 21 used in the gap boding will be referred to as gap glass.

In the formation of a magnetic film on a substrate, a plurality of magnetic films and insulating films such as $SiO_2$ may also be deposited alternately to form a magnetic core 33 comprising a plurality of magnetic films 32, 32 and insulating films 34, 34 as shown in FIG. 4. In FIG. 4, reference numeral 24 denotes laminate glass which connects the magnetic core 33 to the substrate 28, and reference numeral 30 denotes a magnetic gap.

In the above-described laminated magnetic head, the magnetic core 20 and the substrate 26 are heated up to a temperature (typically, at 600° C.) at which the laminate glass 24 become melted thereby bonding the magnetic core 20 to the substrate 26 under applied pressure, and then cooled down to room temperature.

Substrates are made of a material such as Zn ferrite, $MnO$-$NiO$-based ceramic, or $TiO_2$-$CaO$-based ceramic. The magnetic film is usually made of sendust, amorphous alloys, or microcrystal alloys. However, there is a difference in coefficient of linear thermal expansion between the substrate material and the magnetic film material, which induces strain during the cooling process. In general, the substrate material has a smaller coefficient of linear thermal expansion than the magnetic film material, and therefore a greater compressive stress is induced in the magnetic film than in the substrate, and thus strain occurs.

Such strain often brings about a reduction in permeability and an increase in coercive force of the magnetic core. This is a very serious problem with a magnetic head.

For example, FIG. 5 illustrates characteristics of a magnetic head fabricated by: depositing a film of an alloy of $Fe_{79.6}Ta_{10.0}C_{10.4}$ on a substrate of Zn ferrite; performing heat treatment; bonding the same kind of substrate to it via laminate glass (at 700° C.); wherein magnetization curves of the magnetic film measured before and after sandwiched are both shown in the figure. FIG. 6 illustrates similar magnetization curves for the case where a MnO-Ni-based alloy and an $Fe_{65.2}Al_{10.0}Ta_{11.2}C_{13.6}$ alloy are employed as the substrate and magnetic film materials, respectively.

In both combinations of a substrate and magnetic film shown in FIGS. 5 and 6, before the magnetic film is sandwiched between substrates, the magnetic film has small coercive force which is suitable for use as a magnetic head. However, after the magnetic film has been sandwiched between substrates, a significant increase in coercive force is observed in both cases.

Even if the magnetic film is not sandwiched between substrates as in metal-in-gap heads, such degradation can occur as long as the magnetic film is deposited on a ceramic substrate or the like.

To avoid the introduction of strain, there have been research and development efforts to obtain substrate and magnetic film materials having coefficients of linear thermal expansion similar to each other.

Thus, it is now very common to use a substrate and a micro-crystal soft magnetic alloy each having an average coefficient of linear thermal expansion as close to each other as possible in the range $110 \times 10^{-7}$ to $120 \times 10^{-7}/°C$.

However, in addition to the low strain, the magnetic film also has to meet other requirements such as high resistance to corrosion, high saturation flux density, etc., and thus it is difficult to avoid the reduction in the permeability due to the strain without degradation in any other characteristics. Therefore, it is impossible to obtain a magnetic head satisfying all requirements.

During a heating-up process for heat treatment, a difference in thermal expansion between the substrate and the magnetic film also occurs due to the difference in coefficient of linear thermal expansion. However, the strain is introduced during the cooling process after the heat heating process. This is because of the fact that not only the substrates and the magnetic film but also laminate glass disposed between these materials are softened during the heating process, and thus the softened laminate glass absorbs the difference in thermal expansion between the magnetic film and the substrate. This means that there can be only little strain at a high temperature. In contrast, during the cooling process, in particular at temperatures lower than about 600° C., almost all laminate glass becomes solidified, and therefore the laminate glass can no longer absorb the difference in contraction between the magnetic film and the substrate. Thus, the strain is introduced. The strain is introduced not only at the bonding interface between the substrate and the magnetic film via the laminate glass, but also at the interface between the magnetic film and the substrate on which the magnetic film is deposited. This means that proper selection of coefficients of linear thermal expansion is important not only for laminated magnetic heads but also for other types of magnetic heads such as metal-in-gap magnetic heads, thin film magnetic heads, etc.

In the production process of the above-described laminated magnetic head, after a magnetic core has been bonded between substrates via laminate glass and additional several steps have been carried out, the gap bonding process is carried out to connect magnetic cores together so that a magnetic gap is formed. In the production process, a magnetic head is heated during the gap bonding process so as to melt the gap glass forming the magnetic gap. However, there is some possibility that this heating process causes the laminate glass, which bonds the magnetic core to the substrate, to be melted again.

If the laminate glass which has been solidified once is melted or softened again, the bonding position of the magnetic core can be shifted. This can cause a significant failure. In particular, the softening of the laminate glass degrades the accuracy of the magnetic gap length, which results in a fatal failure of the magnetic head.

One known technique to prevent the above problem is to employ crystallized glass or lead glass as the laminate glass and employ glass having a low or middle melting point as the gap glass. The use of low melting point glass for the gap bonding allows the gap bonding to be performed at a temperature lower than the melting point of the laminate glass so that the laminate glass is not melted during the gap bonding.

In general, soft magnetic alloys for use as the magnetic film include fine crystalline grains, and thus if they are exposed to a high temperature, the crystalline grains grow. This results in degradation in soft magnetic characteristics. Therefore, it is not desirable to expose soft magnetic alloys to a high temperature during the production process. In particular, if these soft magnetic alloys are annealed at about 700° C., a great reduction in resistivity (down to 20–50 μΩ) occurs. As a result, eddy-current loss occurs. This causes a reduction in permeability particularly in a high frequency range, and thus a reduction in reproducing efficiency occurs.

To avoid the above problems with the laminated magnetic head, the thickness of each layer of a multilayer magnetic film is reduced and the number of layers is increased.

However, this technique requires complex production processes. Besides, since the volume ratio of insulating layers in the magnetic core increases, the total saturation flux density decreases.

Furthermore, conventional fine crystalline soft magnetic alloys are generally not good in thermal stability.

Therefore, when a magnetic core is bonded to a substrate, the bonding process should not be carried out at such a high temperature that causes degradation in soft magnetic characteristics of the magnetic film. This means that the laminate glass used for the bonding should not have a very high melting point. Usually, crystallized glass or lead glass is employed as the laminate glass so that the laminating bonding can be performed at about 600° C.

On the other hand, glass having a low melting point is poor in resistance to corrosion. Therefore, as for gap glass, such glass having a melting point in the range of 500° C. to 550° C., especially close to 550° C., is used to obtain as good resistance to environment as possible.

However, the sag point of the above-described laminate glass is about 560° C. This means that the sag point of the laminate glass is only 10° C. higher than the melting point of the gap glass. As a result, the position shift due to the softening of the laminate glass during the gap bonding process still occurs in this technique, and thus production reliability is not good. In the crystallized glass, when it is heated and then cooled, precipitation of crystallized glass occurs whereby its melting point increases. This property is desirable for the application of laminate glass. However, because both crystalline and non-crystalline portions exist in a mixture fashion, the external stress can introduce deformation at the bonding portion even at a temperature lower than the melting point.

Furthermore, conventional fine crystalline soft magnetic alloys are generally poor in resistance to corrosion or environment. One known technique to improve the resistance to corrosion is to add some elements (for example, Cr, Ru, Rh, Al, etc.) to a soft magnetic alloy. However, the addition of these elements causes the soft magnetic alloy to have a positive large saturation magnetostriction constant. Besides, the addition of elements also results in a change in the coefficient of linear thermal expansion of the magnetic film. As a result, it becomes very difficult to achieve optimum characteristics in the combination of the magnetic film and the substrate.

It is an object of the present invention to solve the above problems with a magnetic head produced via a heat-treatment process such as glass bonding. More specifically, it is an object of the present invention to provide a magnetic head having high permeability, low coercive force, and excellent resistance to corrosion, and/or to provide a magnetic head having high production reliability.

SUMMARY OF THE INVENTION

According to a first aspect of the present invention, there is provided a magnetic head including a magnetic film deposited on a substrate, being characterized in that:

the magnetic film is made of a soft magnetic alloy having an average coefficient of linear thermal expansion in the range from $125 \times 10^{-7}$ to $150 \times 10^{-7}$/°C. over the temperature range from room temperature to 600° C., a saturation magnetostriction constant in the range from 0 to $+3 \times 10^{-6}$, and a mean crystal grain size less than 30 nm; and the portion of the substrate adjacent to the magnetic core has an average coefficient of linear thermal expansion in the range from $115 \times 10^{-7}$ to $145 \times 10^{-7}$/°C. over the temperature range from room temperature to 600° C.

In the present invention, room temperature is defined as 25° C.

More preferably, the coefficient of linear thermal expansion $\alpha f$ of the soft magnetic alloy and the coefficient of linear thermal expansion $\alpha s$ of the substrate of the magnetic head satisfy the following inequalities:

$$1 \leq \alpha f / \alpha s \leq 1.3.$$

According to a second aspect of the present invention, there is provided a magnetic head including a magnetic film deposited on a substrate, being characterized in that:

the magnetic film is made of a soft magnetic alloy having a mean crystal grain size less than 30 nm after subjected to heat-treatment at a temperature higher than 680° C.;

high-melting-point glass is disposed at least in parts of the region between the magnetic core and the substrate, the high-melting-point glass having a melting point greater than 680° C.; and a non-magnetic material, which is filled in a magnetic gap portion or a winding wire hole or a track width controlling groove so as to connect the magnetic gap portion, is glass having a melting point lower than 680° C.

More preferably, the magnetic film of the magnetic head according to the first or second aspect of the present invention is made of a soft magnetic alloy having a resistivity greater than 120 μΩcm.

Preferably, the magnetic film of the magnetic head according to the first or second aspect of the present invention includes carbide or nitride of metal selected from metal group M defined below, and has a composition represented by the following formula:

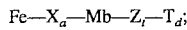

where X is either Si or Al or otherwise both of them; M is at least one metal selected from the group of metals consisting of Zr, Hf, Nb, and Ta; Z is either C or N or otherwise both of them; T is at least one metal selected from the group consisting of Cr, Ti, Mo, W, V, Re, Ru, Rh, Ni, Co, Pd, Pt, and Au; and furthermore:

0.5≦a≦25 (atm %);

1≦b≦10 (atom %):

0.5≦c≦15 (atom %);

0≦d≦10 (atom %); and the other part consists of Fe.

Otherwise, the magnetic film of the magnetic head according to the first or second aspect of the present invention includes carbide or nitride of metal selected from metal group M defined below, and has a composition represented by the following formula:

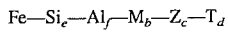

where M is at least one metal selected from the group of metals consisting of Zr, Hf, Nb, and Ta; Z is either C or N or otherwise both of them; T is at least one metal selected from the group consisting of Cr, Ti, Mo, W, V, Re, Ru, Rh, Ni, Co, Pd, Pt, and Au; and furthermore:

8≦e≦15 (atm %);

0.5≦f≦10 (atm %);

1≦b≦10 (atom %);

0.5≦c≦15 (atom %)

0≦d≦10 (atom %); and the other part consists of Fe.

The present invention is based on the consideration of the inventors of the invention on the changes in the permeability and coercive force of magnetic films between before and after sandwiching the magnetic films between substrates. Unlike the conventional techniques in which soft magnetic alloys having a normal soft magnetic characteristics show degradation in the soft magnetic characteristics due to the deposition or sandwiching process, the magnetic head produced according to the present invention has a magnetic core including a magnetic film which maintains excellent soft magnetic characteristics even after subjected to production processes. According to the conventional techniques, it has been believed that the coefficient of linear thermal expansion $\alpha f$ of a soft magnetic alloy comprising a magnetic film should be close to the coefficient of linear thermal expansion $\alpha s$ of a substrate wherein a magnetic film of a magnetic head is formed on the substrate or sandwiched between it and another substrate, so as to reduce the strain arising during the heat-treatment process and the glass bonding process. In contrast, the present invention is absolutely new and epoch-making technique in that the coefficient of linear thermal expansion $\alpha f$ of a soft magnetic alloy is designed to be greater than the coefficient of linear thermal expansion $\alpha s$ of a substrate so as to prevent the reduction in permeability and prevent the increase in coercive force.

BRIEF DESCRIPTION OF THE DRAWINGS

FIGS. 3(a) and 3(b) are schematic diagrams illustrating production processes, wherein FIG. 3(a) illustrates block-shaped substrates to be bonded, and FIG. 3(b) illustrates block-shaped substrates which have been bonded together;

FIG. 4 is an enlarged schematic view illustrating a magnetic gap and its vicinity;

DESCRIPTION OF THE PREFERRED EMBODIMENTS

Figure 1:
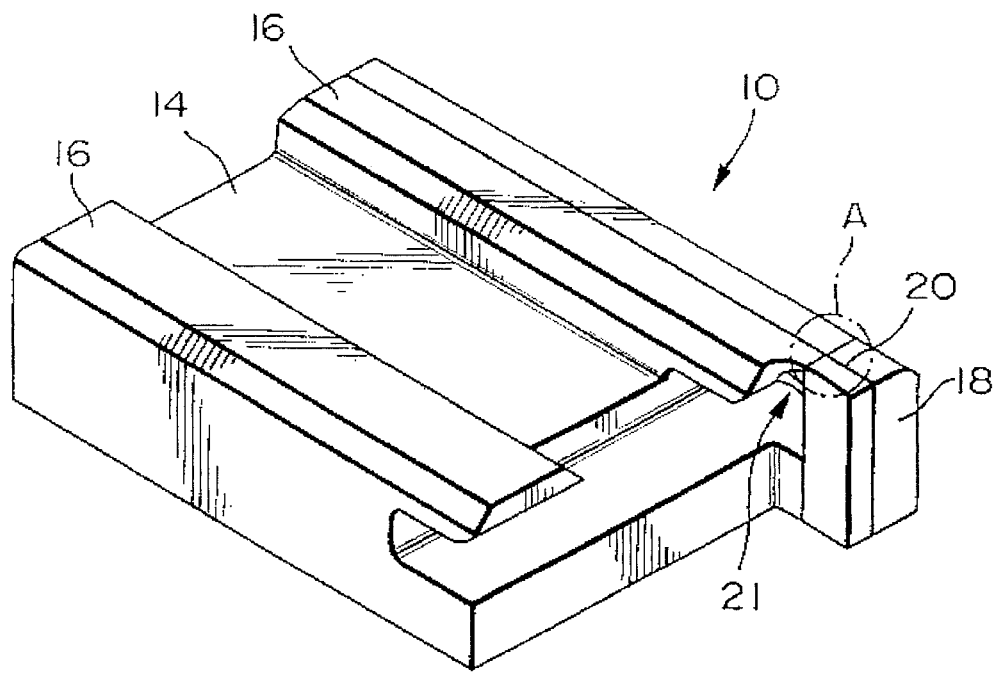
FIG. 1 is a perspective view of a magnetic head for use in a hard disk storage device.
Figure 2:
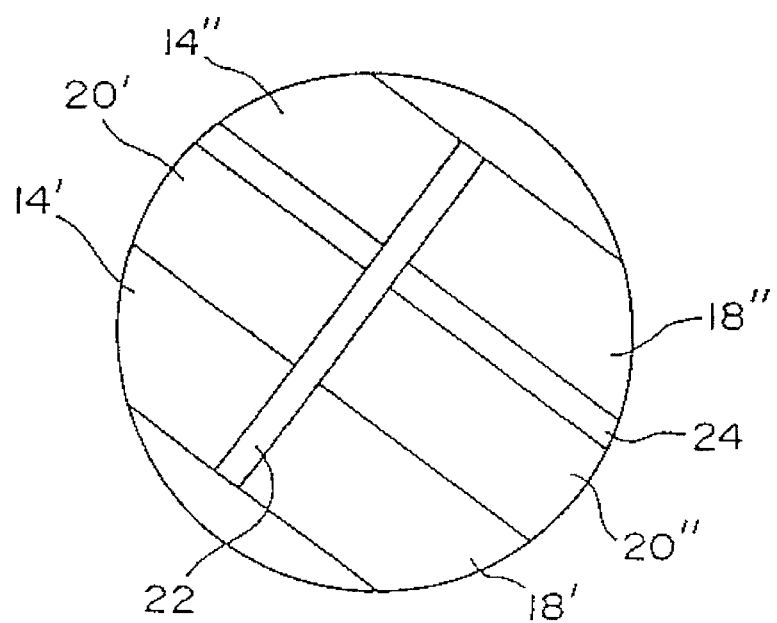
FIG. 2 is an enlarged schematic view illustrating the portion A of FIG. 1.
Figure 5:
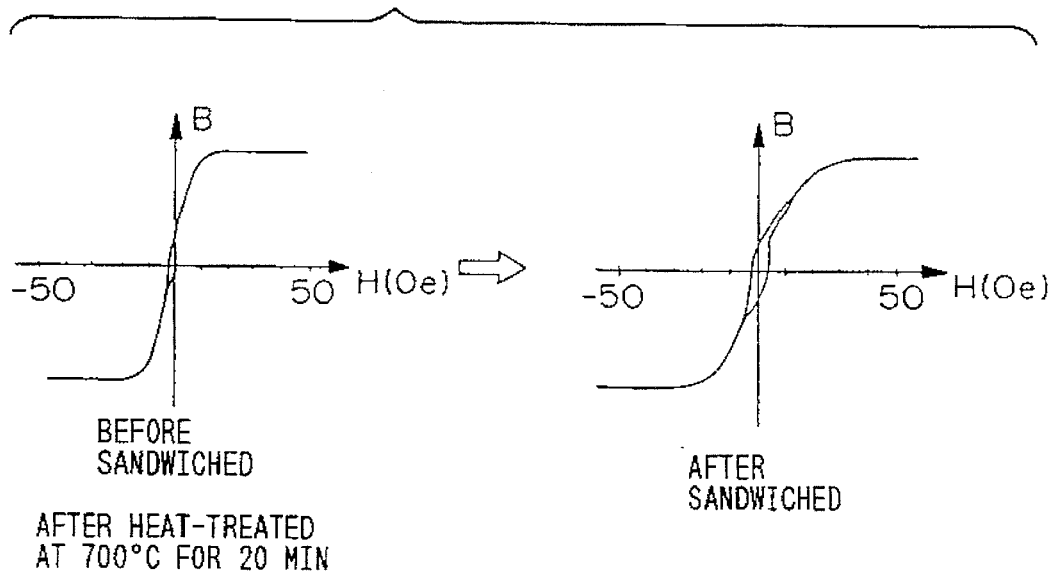
FIG. 5 is a graph illustrating magnetization curves of a soft magnetic alloy according to a conventional technique for both states before and after the soft magnetic alloy has been sandwiched between substrates.
Figure 6:
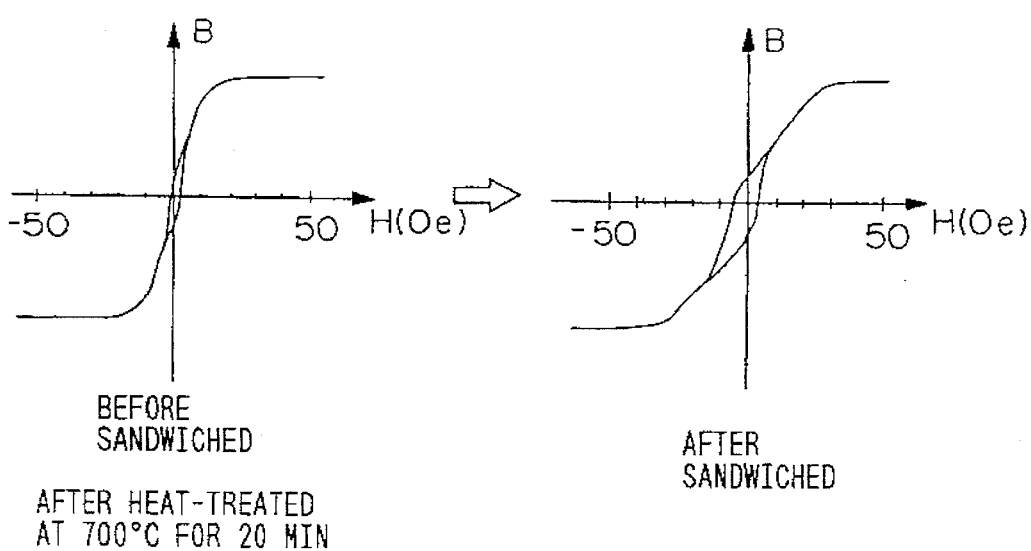
FIG. 6 is a graph illustrating magnetization curves of a soft magnetic alloy according to a conventional technique for both states before and after the soft magnetic alloy has been sandwiched between substrates.

The present invention is applicable to various types of recording/reproducing magnetic heads such as a metal-in-gap magnetic head in which a magnetic film is disposed near a gap as described above. Magnetic heads 10 and 36 shown in FIGS. 1 and 7, respectively, are examples to which the present invention can be applied.

The magnetic head 36 is a metal-in-gap (MIG) magnetic head in which a magnetic gap 42 is formed with a pair of half cores 38, 38 connected to each other, wherein each half core comprises a soft magnetic alloy film 44 deposited on an Mn-Zn ferrite substrate. A coil 46 is wound through a winding wire hole 52. The half magnetic cores 38, 38 each having a deposited soft alloy film are bonded together via gap glass lying in the gap 42 and track width control grooves.

In the present invention, to achieve high permeability and low coercive force, a magnetic film of a magnetic core is made of a soft magnetic alloy having an average coefficient of linear thermal expansion (αf) in the rage of $125 \times 10^{-7}$ to $150 \times 10^{-7}/°C$. over the temperature range from room temperature to 600° C., a saturation magnetostriction constant (λs) in the range from 0 to $+3 \times 10^{-6}$, and a mean crystal grain size less than 30 nm, and furthermore a substrate is adapted such that its portion adjacent to the magnetic core has an average coefficient of linear thermal expansion (αs) in the rage of $115 \times 10^{-7}$ to $145 \times 10^{-7}/°C$. over the temperature range from room temperature to 600° C. As long as the above conditions are satisfied, any materials which are commonly used in various magnetic heads, such as MnO-NiO-based and TiO$_2$-CaO-based ceramic materials can be employed as a substrate material of the present invention. These substrate materials cited here have a coefficient of linear thermal expansion in the range from $115 \times 10^{-7}$ to $145 \times 10^{-7}/°C$.

The strain induced at a laminate glass interface due to the difference in coefficient of linear thermal expansion between a substrate and a magnetic film is due to the difference in contraction which occurs after the laminate glass lying between the substrate and the magnetic film has been completely solidified. The amount of the strain can be roughly estimated by the following equation:

The Amount of Strain = $(αf - αs) \times$ (Solidification Temperature of the Laminate Glass – Room Temperature)

Because the laminate glass is solidified at about 600° C., the strain is induced due to the difference in the average coefficient of linear thermal expansion over the range from room temperature to 600° C. between the substrate and the magnetic film.

Preferably, the relationship represented by the following inequalities should exist between αf and αs:

$$1 \leq αf/αs \leq 1.3$$

The present invention is based on the following knowledge acquired via investigations made by the inventors of the present invention.

(a) If αf/αs is less than 1, and if λs is greater than 0, an anisotropic component in the direction normal to the magnetic film plane is generated. As a result, the coercive force increases.

(b) If αf/αs is greater than 1, and if λs is less than 0, an anisotropic component in the direction normal to the magnetic film plane is also generated, and thus the coercive force increases.

(c) If αf/αs is greater than 1.3, and if λs is greater than 0, the permeability decreases, and the soft magnetic characteristics become unstable.

Furthermore, the magnetic film is made of a soft magnetic alloy comprising fine crystal grains having a mean grain size less than 30 nm after heat-treatment at a temperature higher than 680° C., and having a resistivity greater than 120 μΩcm. This allows the heat-treatment to be carried out at a higher temperature, and thus it becomes possible to employ laminate glass having a melting point higher than 680 ° C., and gap glass having a melting point less than 680° C. With this arrangement, high-reliability gap bonding can be performed without the melting of the laminate glass, and thus without failures such as the position shift of gap.

Any soft magnetic alloys having the following composition including crystal of metal carbide or metal nitride wherein the metal is selected from the metal group M can be employed as the magnetic film material of the present invention:

$$Fe—X_a—M_b—Z_c—T_d$$

where X is either Si or Al or otherwise both, M is at least one metal selected from the group consisting of Zr, Hf, Nb, and Ta, Z is either C or N or otherwise both, and T is at least one metal selected from the group consisting of Cr, Ti, Mo, W, V, Re, Ru, Rh, Ni, Co, Pd, Pt, and Au, furthermore, in which $5 \leq a \leq 25$ (atm %);

$1 \leq b \leq 10$ (atom %);

$0.5 \leq c \leq 15$ (atom %); $0 \leq d \leq 10$ (atom %); and the other part consists of Fe.

A soft magnetic alloy having a composition represented by the following formula is more preferable:

$$Fe\text{---}Si_e\text{---}Al_f\text{---}M_b\text{---}Z_c\text{---}T_d$$

where M is at least one metal selected from the group consisting of Zr, Hf, Nb, and Ta, Z is either C or N or otherwise both, and T is at least one metal selected from the group consisting of Cr, Ti, Mo, W, V, Re, Ru, Rh, Ni, Co, Pd, Pt, and Au, furthermore in which $8 \leq e \leq 15$ (atm %);

$0.5 \leq f \leq 10$ (atm %);

$1 \leq b \leq 10$ (atom %);

$0.5 \leq c \leq 15$ (atom %);

$0 \leq d \leq 10$ (atom %); and the other part consists of Fe.

In the soft alloy applied to the magnetic film, Fe is a major component which determines basic magnetic properties. Grains comprising the carbide or nitride of the metal selected from the group M suppress the growth of crystal grains containing Fe as the major component into greater grains, and improve the resistance of the soft magnetic characteristics to high temperatures. As a result, it becomes possible to employ laminate glass having a higher melting point. The above carbide or nitride of the metal selected from the group M also allows the sputtered material to become amorphous more easily. To obtain the above effects, it is preferable that the concentration of the added metal is greater than 1 atm %. However, the concentration greater than 10 atm % is undesirable because such a high concentration causes a reduction in the saturation flux density Bs.

C or N is added to be combined with the above-described metal M thereby producing its carbide or nitride component. Besides, the addition of C or N allows the sputtered material to become amorphous easily. If the magnetic film is amorphous when it is deposited by the sputtering, fine crystal grains having uniform characteristics can be advantageously formed easily in a later heat-treatment process. To obtain the above effects, it is preferable that the concentration of added C or N is greater than 0.5 atm %. However, the concentration greater than 15 atm % is undesirable because such a high concentration causes a reduction in the saturation flux density Bs.

The addition of Al has the following effects:

(1) The addition of Al improves the resistance to environment;

(2) Al is dissolved in Fe crystal grains, thereby increasing the resistivity;

(3) The addition of Al causes a reduction in the growth rate of crystal grains, and also a reduction in magnetocrystalline anisotropy energy thereby improving the resistivity of soft magnetic characteristics to high temperatures;

To achieve the effect (1) described above, it is preferable that the concentration of added Al is greater than 0.5 atm %. However, the concentration greater than 25 atm % is undesirable because such a high concentration causes excess magnetostriction $\lambda_s$ and a reduction in the saturation flux density Bs.

The addition of Si has the following effects:

(1) It suppresses the increase in the magnetostriction $\lambda_s$ due to the addition of Al;

(2) The addition of Si allows the sputtered magnetic film to become amorphous easily. In conventional techniques, a large amount of carbide or nitride has to be added to make the magnetic film amorphous. In the present invention, however, it is possible to reduce the required content of carbide or nitride and thus it is possible to suppress the reduction in the saturation flux density due to the addition of carbide or nitride;

(3) Si is dissolved in Fe crystal grains, thereby increasing the resistivity;

(4) The addition of Si causes a reduction in the growth rate of crystal grains, and also a reduction in magnetocrystalline anisotropy energy thereby improving the resistivity of soft magnetic characteristics to high temperatures;

To achieve the above effects (1) through (4) associated with the addition of Si, it is preferable that the concentration of added Si is greater than 0.5 atm %. However, the concentration greater than 25 atm % is undesirable because such a high concentration causes a reduction in the saturation flux density Bs.

If both Si and Al are added, it is possible to suppress the magnetostriction $\lambda_s$ to a low level in the range from 0 to $+3.0 \times 10^{-6}$. Furthermore, this also improves the resistivity to environment. Therefore, the addition of both elements is more preferable to obtain the effects of the present invention. However, the ratio of the amount of added Si to that of Al (Si/Al) should be greater than 3/2 to achieve more reliable suppression of the magnetostriction $\lambda_s$.

Other unintentionally-added impurities such as H, O, S, etc., are allowed to be contained in the soft magnetic alloy unless their concentrations are too high to degrade the desirable characteristics. It should be understood that such a composition is included in the above-described compositions of the soft magnetic alloy according to the present invention.

If the above-described soft magnetic alloy is subjected to heat-treatment, the carbide or nitride of the metal selected from the group M is uniformly distributed throughout the alloy.

By way of example, X-ray diffraction patterns of an $Fe_{76.3}Si_{12.0}Al_{2.1}Hf_{3.6}C_{6.0}$ alloy film have been measured before and after the heat-treatment, The heat-treatment is carried out by maintaining the sample at 680° C. for 20 min. The X-ray diffraction patterns are measured using a Co-K$\alpha$ line as an X-ray source. FIG. 9 illustrates an X-ray diffraction pattern obtained before the heat-treatment, and FIG. 8 illustrates an X-ray diffraction pattern obtained after the heat-treatment.

FIG. 9 shows a broad halo pattern, which means that the soft magnetic alloy is amorphous before the heat-treatment.

Figure 8:
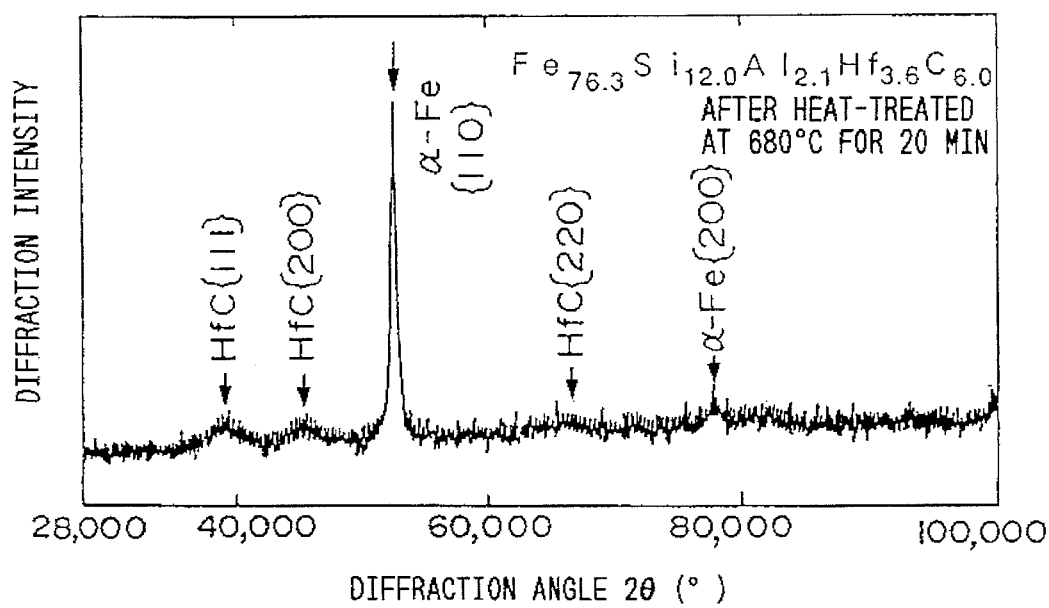
FIG. 8 illustrates an X-ray diffraction pattern of a soft magnetic alloy after heat-treatment, according to an embodiment of the present invention.
Figure 9:
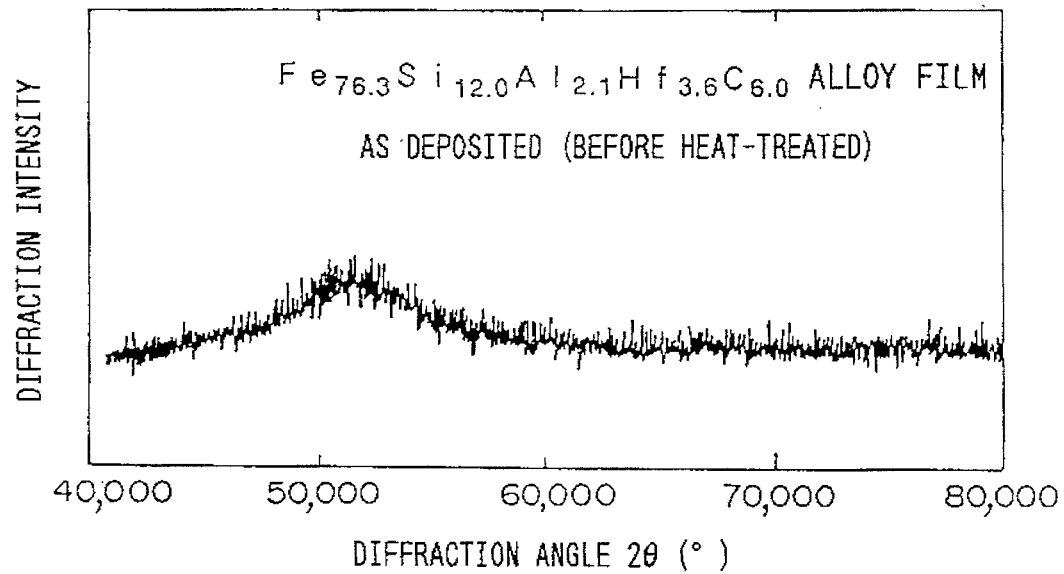
FIG. 9 illustrates an X-ray diffraction pattern of a soft magnetic alloy before heat-treatment, according to an embodiment of the present invention.

On the other hand, the X-ray diffraction pattern in FIG. 8 indicates that there exist $\alpha$-Fe (body-centered cubic structure crystal containing Fe as the major component) and HfC (hafnium carbide crystal) in the soft magnetic alloy after the heat-treatment. The peak position corresponding to $\alpha$-Fe in the diffraction pattern also indicates that Si and Al are dissolved in the $\alpha$-Fe crystal. From the half-widths of peaks corresponding to $\alpha$-Fe and HfC, respectively, in the X-ray diffraction pattern, it can be determined that the crystal grain size of $\alpha$-Fe is 19 nm and that of HfC is 3.4 nm.

For evaluation, a soft magnetic alloy film applicable to the magnetic film according to the present embodiment was deposited on a flat plane substrate 26, and another substrate 26' was then bonded to it via laminate glass 24. The permeability and coercive force of this sample obtained in this way were measured, and furthermore its resistance to corrosion was evaluated.

The substrates 26, 26' used have a thickness of 1 mm. The thicknesses of the magnetic film 20 and the laminate glass are 5 µm and 0.5 µm, respectively. The bonding was carried out at 700° C. for 20 min while pressing the substrates against each other. The magnetic film was deposited by means of an RF diode sputtering technique using a composite target including an Fe target or Fe-based alloy target and graphite and other various elements.

The above sputtering was done under an Ar pressure of 5 m Torr with an input RF power density of $2.4 \times 10^4 W/m^2$ in a vacuum chamber having the capability of the ultimate pressure less than $5 \times 10^{-7}$ Torr.

The coefficient of linear thermal expansion $\alpha f$ of the soft magnetic alloy was estimated from the coefficient of linear thermal expansion of a soft magnetic alloy of the same type which was deposited on a substrate whose physical properties are known, wherein the coefficient was determined by measuring the temperature dependence of the curvature using a photosensor. The coefficient of linear thermal expansion $\alpha s$ of the substrates was measured using a thermal mechanical analyzer (TMA). The saturation magnetostriction constant $\lambda s$ is determined using an optical lever scheme before the magnetic film was sandwiched between the substrates. The initial permeability $\mu$ was measured using a coil having a shape of character 8. The coercive force Hc was measured using a DC B-H loop tracer. The resistance to corrosion was evaluated by performing visual inspection of rust and colors on samples which had been kept in a salt solution for 24 hours. In the following tables representing the evaluation results, "⊚" denotes "no change", "○" denotes "a very little change", "Δ" denotes "a slight change which can be accepted in practical use", and "x" denotes "a significant change which cannot be accepted".

Tables 1 through 4 illustrate the evaluation results.

Figure 10:
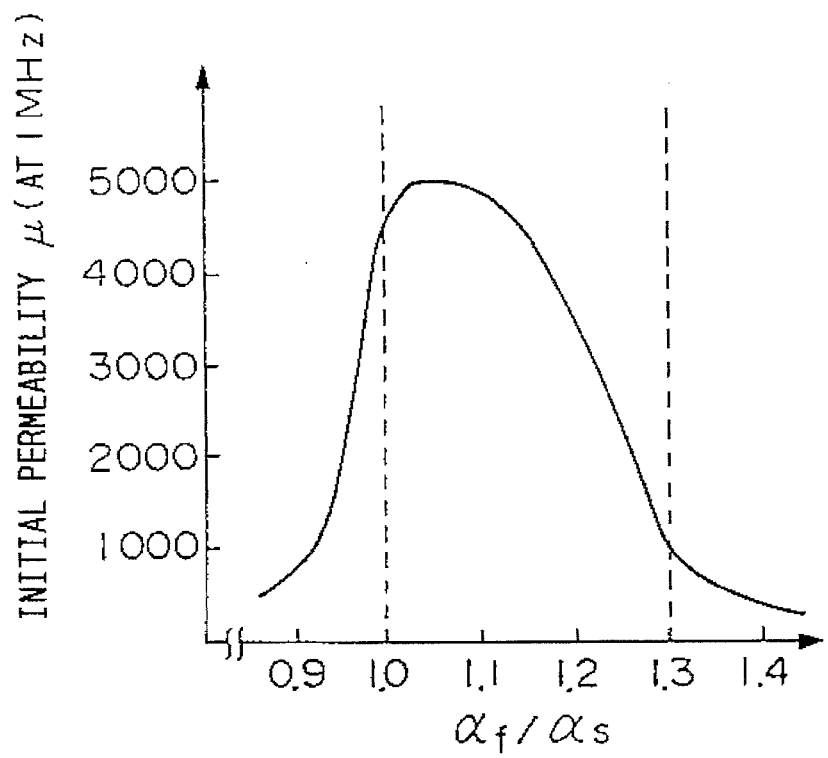
FIG. 10 is a graph illustrating the relationship between the ratio αf/αs and the initial permeability.
Figure 11:
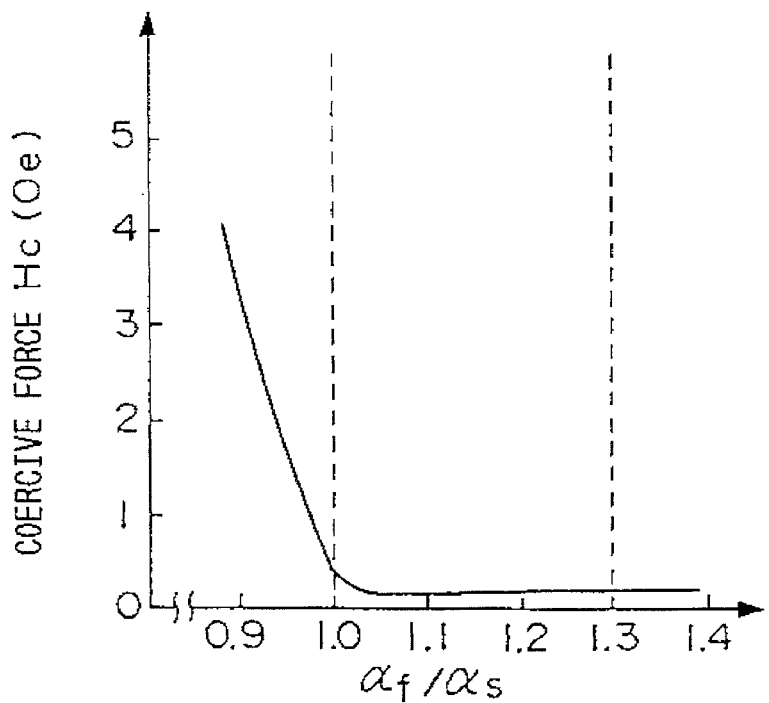
FIG. 11 is a graph illustrating the relationship between the ratio αf/αs and the coercive force.

FIG. 10 is a graph illustrating the relationship between the ratio ($\alpha f/\alpha s$) of the coefficient of linear thermal expansion $\alpha f$ of the magnetic film to that of the substrate $\alpha s$ and the initial permeability, and FIG. 11 is a graph illustrating the relationship between the ratio $\alpha f/\alpha s$ and the coercive force.

From Tables 1 through 4, it can be seen that the magnetic films and substrates according to the present embodiment have both high permeability and low coercive force, as well as good resistance to corrosion.

In contrast, sample No. 1 prepared for comparison with an alloy having a saturation magnetostriction constant less than 0 has a small permeability and very large coercive force.

TABLE 1

| No. | Film Composition (atm %) | $\alpha f$ ($10^{-7}/°C.$) |
|---|---|---|
| Samples for Comparison | | |
| 1 | $Fe_{79.6}Ta_{10.0}C_{10.4}$ | 120 |
| 2 | $Fe_{65.2}Al_{10.0}Ta_{11.2}C_{13.6}$ | 117 |
| 3 | $Fe_{65.2}Al_{10.0}Ta_{11.2}C_{13.6}$ | 117 |
| 4 | $Fe_{75.3}Si_{12.4}Al_{4.3}Hf_{3.0}C_{5.0}$ | 139 |
| Samples according to the ivention | | |
| 11 | $Fe_{81.8}Si_{10.2}Hf_{3.0}C_{5.0}$ | 138 |
| 12 | $Fe_{80.7}Si_{10.5}Zr_{3.3}C_{5.5}$ | 137 |
| 13 | $Fe_{78.0}Si_{11.0}Nb_{5.0}C_{6.0}$ | 130 |
| 14 | $Fe_{79.9}Si_{9.3}Ta_{4.8}C_{6.0}$ | 132 |
| 15 | $Fe_{80.7}Al_{6.2}Hf_{5.0}C_{8.1}$ | 129 |
| 16 | $Fe_{79.1}Al_{6.8}Zr_{5.3}C_{8.8}$ | 128 |
| 17 | $Fe_{77.9}Al_{5.1}Nb_{6.0}C_{9.0}$ | 127 |
| 18 | $Fe_{78.8}Al_{5.0}Ta_{7.9}C_{8.3}$ | 127 |
| 19 | $Fe_{75.3}Si_{12.4}Al_{4.3}Hf_{3.0}C_{5.0}$ | 139 |
| 20 | $Fe_{75.9}Si_{12.0}Al_{4.8}Zr_{2.8}C_{4.5}$ | 140 |
| 21 | $Fe_{67.4}Si_{11.5}Al_{4.0}Nb_{8.1}C_{9.0}$ | 131 |
| 22 | $Fe_{66.7}Si_{12.0}Al_{5.0}Ta_{7.8}C_{8.5}$ | 130 |
| 23 | $Fe_{72.0}Si_{12.5}Al_{4.5}Hf_{3.0}C_{5.0}Cr_{3.0}$ | 140 |
| 24 | $Fe_{72.7}Si_{12.0}Al_{3.0}C_{4.8}Ti_{4.5}$ | 137 |
| 25 | $Fe_{72.5}Si_{12.1}Al_{3.8}Hf_{2.8}C_{4.0}Mo_{4.8}$ | 139 |
| 26 | $Fe_{72.5}Si_{11.0}Al_{4.0}Hf_{2.9}C_{4.1}W_{4.6}$ | 139 |
| 27 | $Fe_{73.0}Si_{11.0}Al_{4.1}Hf_{3.0}C_{4.0}V_{4.9}$ | 138 |
| 28 | $Fe_{73.1}Si_{12.7}Al_{3.7}Hf_{2.5}C_{3.9}Re_{4.1}$ | 141 |
| 29 | $Fe_{75.7}Si_{12.6}Al_{3.8}C_{2.3}C_{3.5}Rh_{2.1}$ | 140 |
| 30 | $Fe_{73.7}Si_{12.0}Al_{4.0}Hf_{2.2}C_{3.4}Ni_{4.7}$ | 145 |
| 31 | $Fe_{71.2}Si_{12.2}Al_{4.0}Hf_{3.0}C_{4.8}Co_{4.8}$ | 141 |
| 32 | $Fe_{73.6}Si_{12.0}Al_{3.48}Hf_{2.7}C_{3.9}Pd_{4.0}$ | 142 |
| 33 | $Fe_{74.8}Si_{12.1}Al_{3.8}Hf_{2.3}C_{5.0}Pt_{2.0}$ | 144 |
| 34 | $Fe_{74.5}Si_{12.1}Al_{3.9}Hf_{2.4}C_{4.8}Au_{2.3}$ | 140 |
| 35 | $Fe_{72.6}Si_{12.4}Al_{4.0}Hf_{2.3}C_{4.7}Ru_{4.0}$ | 141 |

TABLE 2

| No. | Substrate Type | $\alpha s$ ($\times 10^{-7}/°C.$) | $\lambda s$ of Film ($\times 10^{-6}$) | $\mu$ (at 1 MHz) | Hc (Oe) | Corrosion Resistance |
|---|---|---|---|---|---|---|
| Samples for Comparison | | | | | | |
| 1 | Zn ferrite-based | 100 | −3.1 | 1600 | 3.3 | X |
| 2 | MnO—NiO-based | 135 | +3.3 | 680 | 4.0 | ○ |
| 3 | TaO₂—CaO-based | 120 | +3.3 | 990 | 1.2 | ○ |
| 4 | Zn ferrite-based | 100 | +0.8 | 430 | 0.20 | ○ |
| Samples according to the invention | | | | | | |
| 11 | MnO—NiO-based | 135 | +1.0 | 3800 | 0.20 | Δ |
| 12 | MnO—NiO-based | 135 | +0.8 | 4000 | 0.21 | Δ |
| 13 | TiO—CaO-based | 125 | +0.7 | 3200 | 0.19 | Δ |
| 14 | TiO—CaO-based | 125 | +1.6 | 3100 | 0.18 | Δ |
| 15 | TiO—CaO-based | 120 | +2.1 | 2500 | 0.18 | Δ |
| 16 | TiO—CaO-based | 120 | +2.5 | 2300 | 0.20 | Δ |
| 17 | TiO—CaO-based | 120 | +2.0 | 2000 | 0.20 | Δ |
| 18 | TiO—CaO-based | 120 | +1.9 | 2200 | 0.17 | Δ |
| 19 | MnO—NiO-based | 135 | +0.8 | 5100 | 0.15 | ○ |
| 20 | MnO—NiO-based | 135 | +1.0 | 5000 | 0.13 | ○ |
| 21 | TiO—CaO-based | 130 | +0.9 | 4500 | 0.15 | ○ |

TABLE 2-continued

| No. | Substrate Type | αs (×10⁻⁷/°C.) | λs of Film (×10⁻⁶) | μ (at 1 MHz) | Hc (Oe) | Corrosion Resistance |
|---|---|---|---|---|---|---|
| 22 | TiO—CaO-based | 130 | +1.2 | 4300 | 0.20 | ○ |
| 23 | MnO—NiO-based | 135 | +1.7 | 3800 | 0.20 | ⊚ |
| 24 | MnO—NiO-based | 135 | +1.3 | 4100 | 0.25 | ⊚ |
| 25 | MnO—NiO-based | 135 | +1.0 | 4000 | 0.29 | ⊚ |
| 26 | MnO—NiO-based | 135 | +2.0 | 4300 | 0.30 | ⊚ |
| 27 | MnO—NiO-based | 135 | +1.0 | 3900 | 0.31 | ⊚ |
| 28 | MnO—NiO-based | 135 | +2.0 | 2200 | 0.21 | ⊚ |
| 29 | MnO—NiO-based | 135 | +1.4 | 3000 | 0.18 | ⊚ |
| 30 | MnO—NiO-based | 135 | +2.5 | 1800 | 0.11 | ⊚ |
| 31 | MnO—NiO-based | 135 | +2.7 | 1500 | 0.10 | ⊚ |
| 32 | MnO—NiO-based | 135 | +1.5 | 4000 | 0.13 | ⊚ |
| 33 | MnO—NiO-based | 135 | +1.2 | 4300 | 0.11 | ⊚ |
| 34 | MnO—NiO-based | 135 | +1.1 | 4800 | 0.10 | ⊚ |
| 35 | MnO—NiO-based | 135 | +1.9 | 2300 | 0.20 | ⊚ |

TABLE 3

| No. | Film Composition (atm %) | αf (10⁻⁷/°C.) |
|---|---|---|
| Samples according to the Invention | | |
| 36 | $Fe_{21.5}Si_{11.0}Hf_{2.8}N_{4.7}$ | 141 |
| 37 | $Fe_{61.6}Si_{10.3}Zr_{3.0}N_{5.1}$ | 138 |
| 38 | $Fe_{78.6}Si_{7.8}Ta_{6.6}N_{7.0}$ | 130 |
| 39 | $Fe_{79.6}Si_{8.9}Nb_{5.5}N_{6.0}$ | 132 |
| 40 | $Fe_{82.7}Al_{6.1}Hf_{5.0}N_{6.1}$ | 129 |
| 41 | $Fe_{82.3}Al_{5.6}Zr_{5.1}N_{7.0}$ | 128 |
| 42 | $Fe_{75.0}Al_{8.0}Ta_{8.0}N_{9.0}$ | 126 |
| 43 | $Fe_{76.5}Al_{7.3}Nb_{7.9}N_{6.3}$ | 127 |
| 44 | $Fe_{75.8}Si_{12.1}Al_{4.3}Hf_{2.8}N_{5.0}$ | 142 |
| 45 | $Fe_{75.7}Si_{12.6}Al_{4.0}Zr_{3.0}N_{4.7}$ | 140 |
| 46 | $Fe_{73.7}Si_{11.0}Al_{3.8}Ta_{5.5}N_{6.0}$ | 131 |
| 47 | $Fe_{73.9}Si_{11.3}Al_{4.1}Nb_{5.3}N_{5.4}$ | 130 |
| 48 | $Fe_{74.2}Si_{12.1}Al_{4.0}Hf_{2.7}N_{3.8}Cr_{3.2}$ | 139 |
| 49 | $Fe_{73.2}Si_{12.3}Al_{3.8}Hf_{2.6}N_{4.0}Ru_{4.1}$ | 140 | smaller than 1, and with a large saturation magnetostriction constant of 3.3, the permeability has become very small, and the coercive force has become very large.

Similarly, in the case of sample No. 3 prepared for comparison with a small ratio αf/αs of 0.98 and a large saturation magnetostriction constant of 3.3, while the characteristics are not so poor as in sample No. 2, the permeability is small and the coercive force is large.

In sample No. 4 prepared for comparison with a large ratio αf/αs of 1.4, while small coercive force is obtained, the permeability is also small.

As can be seen from FIG. 10, if the ratio αf/αs is in the range from 1 to 1.3, initial permeability greater than 1000 can be obtained.

From FIG. 11, it can be seen that if the ratio αf/αs is greater than 1, coercive force less than 0.5 Oe can be obtained.

Therefore, if the ratio αf/αs is in the range from 1 to 1.3, it is possible to obtain both high initial permeability and low coercive force.

Furthermore, changes in permeability and coercive force were measured between before and after a magnetic film

TABLE 4

| No. | Substrate Type | αs (×10⁻⁷/°C.) | λs of Film (×10⁻⁶) | μ (at 1 MHz) | Hc (Oe) | Corrosion Resistance |
|---|---|---|---|---|---|---|
| Samples according to the Invention | | | | | | |
| 36 | MnO—NiO-based | 135 | +0.7 | 4000 | 0.20 | Δ |
| 37 | MnO—NiO-based | 135 | +0.9 | 4100 | 0.20 | Δ |
| 38 | TiO—CaO-based | 125 | +1.7 | 3300 | 0.23 | Δ |
| 39 | TiO—CaO-based | 125 | +1.5 | 3800 | 0.19 | Δ |
| 40 | TiO—CaO-based | 120 | +2.3 | 2500 | 0.19 | Δ |
| 41 | TiO—CaO-based | 120 | +2.0 | 2300 | 0.20 | Δ |
| 42 | TiO—CaO-based | 120 | +2.9 | 1300 | 0.21 | Δ |
| 43 | TiO—CaO-based | 120 | +2.7 | 1500 | 0.23 | Δ |
| 44 | MnO—NiO-based | 135 | +0.9 | 5000 | 0.11 | ○ |
| 45 | MnO—NiO-based | 135 | +1.1 | 4900 | 0.12 | ○ |
| 46 | TiO—CaO-based | 130 | +1.9 | 4000 | 0.20 | ○ |
| 47 | TiO—CaO-based | 130 | +1.7 | 4200 | 0.21 | ○ |
| 48 | MnO—NiO-based | 135 | +1.8 | 3800 | 0.15 | ⊚ |
| 49 | MnO—NiO-based | 135 | +2.0 | 3600 | 0.14 | ⊚ |

Besides, this sample shows poor resistance to corrosion. Thus, this sample is unsuitable for a magnetic head.

In sample No. 2 prepared for comparison with a ratio (αf/αs) of the coefficient of linear thermal expansion αf of the magnetic film to that of the substrate as of 0.87, that is was sandwiched between substrates for both soft magnetic film materials prepared according to and not according to the present embodiment of the invention. Tables 5 and 6 show the evaluation results.

Figure 12:
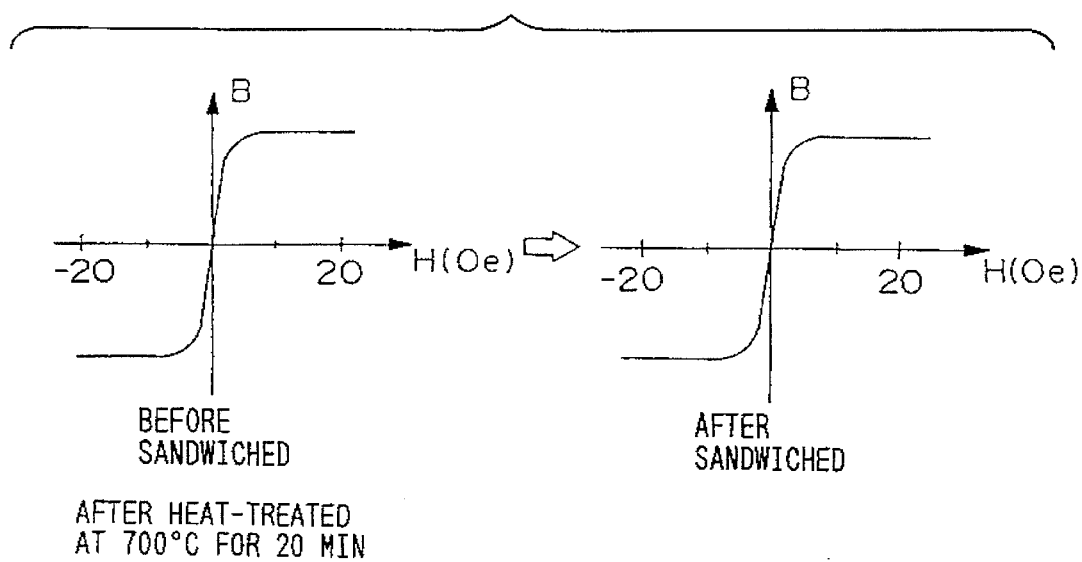
FIG. 12 is a graph illustrating magnetization curves of a soft magnetic alloy according to the embodiment of the present invention, for both states before and after the soft magnetic alloy has been sandwiched between substrates.

FIG. 12 illustrates magnetization curves obtained before and after a magnetic film was sandwiched between substrates, wherein the soft magnetic alloy of sample No. 19 was used as the magnetic film.

TABLE 5

| No. | Film Composition (atm %) | $\alpha f$ ($\times 10^{-7}/°C.$) | $\alpha s$ ($\times 10^{-7}/°C.$) |
|---|---|---|---|
| 1 | $Fe_{79.6}Ta_{10.0}C_{10.4}$ | 120 | 100 |
| 2 | $Fe_{65.2}Al_{10.0}Ta_{11.2}C_{13.6}$ | 117 | 135 |
| 3 | $Fe_{65.2}Al_{10.0}Ta_{11.2}C_{13.6}$ | 117 | 120 |
| 11 | $Fe_{81.8}Si_{10.2}Hf_{3.0}C_{5.0}$ | 138 | 135 |
| 15 | $Fe_{80.7}Al_{6.2}Hf_{5.0}C_{8.1}$ | 129 | 120 |
| 19 | $Fe_{75.3}Si_{12.4}Al_{4.3}Hf_{3.0}C_{5.0}$ | 139 | 135 |
| 20 | $Fe_{75.9}Si_{12.0}Al_{4.8}Zr_{2.8}C_{4.5}$ | 140 | 135 |

TABLE 6

| | | Before Sandwiched | | After Sandwiched | |
|---|---|---|---|---|---|
| No. | $\lambda s$ of Film ($\times 10^{-6}$) | $\mu$ (at 1 MHz) | Hc (Oe) | $\mu$ (at 1 MHz) | Hc (Oe) |
| 1 | −3.1 | 2300 | 0.93 | 1600 | 3.3 |
| 2 | +3.3 | 1300 | 2.2 | 680 | 4.0 |
| 3 | +3.3 | 3800 | 0.41 | 990 | 1.2 |
| 11 | +1.0 | 4000 | 0.18 | 3800 | 0.20 |
| 15 | +2.1 | 3100 | 0.14 | 2500 | 0.18 |
| 19 | +0.8 | 5200 | 0.12 | 5100 | 0.15 |
| 20 | +1.0 | 5200 | 0.11 | 5000 | 0.13 |

From Tables 5 and 6, it can be seen that in combinations of magnetic films and substrates prepared for comparison, magnetic films show high permeabilities and low coercive force before sandwiched between substrates, however great reductions in permeabilities and increases in coercive force have been observed after sandwiched between substrates.

In contrast, in the case of the combinations of magnetic films and substrates according to the present embodiment of the invention, almost no changes are observed in permeability and coercive force between before and after sandwiching a magnetic film between substrates, and high permeability and low coercive force are maintained.

From FIG. 12, it can also be seen that the soft magnetic alloy according to the present embodiment of the invention show almost no change in the magnetization curve between before and after sandwiched between substrates, and low coercive force is maintained.

Magnetic heads of the type shown in FIG. 1 for use in a hard disk storage device were fabricated with magnetic films and substrates according to and not according to the present embodiment of the invention, and the normalized output of isolated pulse was measured on these magnetic heads.

The magnetic heads prepared for evaluation have a track width of 5.5 µm and a gap depth of 2.2 µm. Hard disks having coercive force Hc of 1600 Oe were used for evaluation of the magnetic heads. The measurement was carried out at a circumferential speed of 8.84 m/s maintaining the floating height of a magnetic head at 80 nm.

The measurement results are shown in Tables 7 and 8.

From Tables 7 and 8, it can be seen that the magnetic head (No. 19) according to the present embodiment of the invention provides sufficiently high normalized output of isolated pulse.

TABLE 7

| No. | Film Composition (atm %) | $\alpha$ of Film $\alpha f$ ($\times 10^{-7}/°C.$) | $\alpha$ of Substrate $\alpha s$ ($\times 10^{-7}/°C.$) |
|---|---|---|---|
| 1 | $Fe_{79.6}Ta_{10.0}C_{10.4}$ | 120 | 100 |
| 3 | $Fe_{65.2}Al_{10.0}Ta_{11.2}C_{13.6}$ | 117 | 120 |
| 19 | $Fe_{75.3}Si_{12.4}Al_{4.3}Hf_{3.0}C_{5.0}$ | 139 | 135 |

TABLE 8

| No. | Substrate Type | $\lambda s$ of Film ($\times 10^{-6}$) | Output of Isolated Pulse (Normalized to the Number of Turns) |
|---|---|---|---|
| 1 | Zn ferrite-based | −3.1 | −3.9 dB |
| 3' | $Fe_2O_3$-based | +3.3 | 0 |
| 19 | MnO—NiO-based | +0.8 | +2.9 dB |

In contrast, the normalized output of isolated pulse is low in the case of the magnetic head (No. 1) prepared for comparison with a magnetic film having a coefficient of linear thermal expansion of $120 \times 10^{-7}/°C.$ and having a saturation magnetostriction constant of $-3.1 \times 10^{-6}$, and in the case of the magnetic head (No. 3') prepared for comparison with a magnetic film having a coefficient of linear thermal expansion of $117 \times 10^{-7}/°C.$, a saturation magnetostriction constant of $+3.3 \times 10^{-6}$ and a ratio $\alpha f/\alpha s$ of 0.98.

Figure 7:
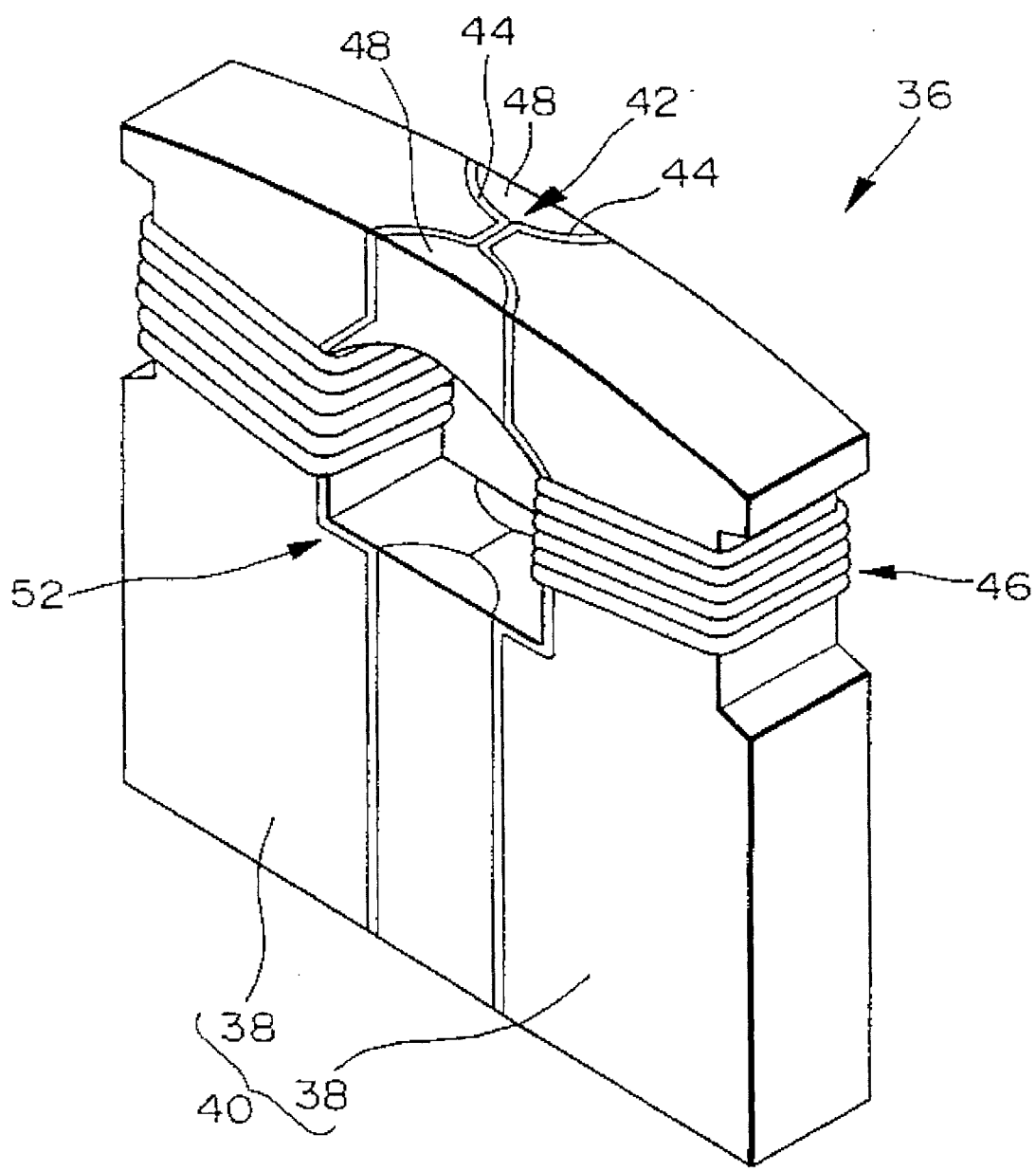
FIG. 7 is a perspective view of a video magnetic head for use in a VTR.

A magnetic head of the type shown in FIG. 7 for use in a VTR was fabricated with a magnetic film and substrates according to the present embodiment of the invention, and the self recording and playback output normalized to inductance was evaluated. The characteristics of the magnetic film and substrates used in the magnetic head for evaluation are shown in Table 9.

The magnetic head prepared for evaluation has a track width of 23 µm and a gap depth of 20 µm. A magnetic tape having coercive force Hc of 1500 Oe was used for evaluation of the magnetic heads. The measurement was carried out at a relative speed between the magnetic head and the magnetic tape of 3.8 m/s.

For comparison, a magnetic head was also fabricated with materials having small $\alpha f$ such as $115 \times 10^{-7}$ and small ratio $\alpha f/\alpha s$ such as 0.98 as well as a large saturation magnetostriction constant of the magnetic film such as $+3.2 \times 10^{-6}$.

TABLE 9

| No. | Film Composition (atm %) | $\alpha$ of Film $\alpha f$ ($\times 10^{-7}/°C.$) | $\alpha$ of Substrate $\alpha s$ ($\times 10^{-7}/°C.$) | Substrate Type | $\lambda s$ of Film ($\times 10^{-6}$) |
|---|---|---|---|---|---|
| 5 | $Fe_{65.2}Al_{9.7}Ta_{12.0}C_{13.6}$ | 115 | 117 | Mn—Zn ferrite | +3.2 |
| 19' | $Fe_{75.3}Si_{12.4}Al_{4.3}Hf_{3.0}C_{5.0}$ | 139 | 117 | Mn—Zn ferrite | +0.8 |

Figure 13:
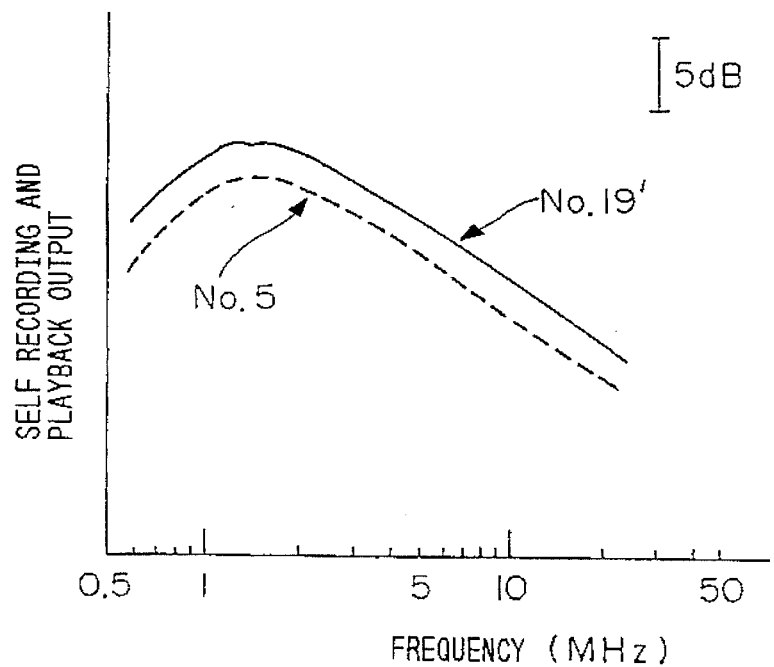
FIG. 13 is a graph illustrating the frequency dependence of the self recording and playback output of a magnetic head.

The evaluation results are shown in FIG. 13.

As can be seen from FIG. 13, magnetic head No. 19' fabricated with the materials having $\alpha f/\alpha s$ of 1.19 according to the present embodiment of the invention provides greater self recording and playback output by 2–3 dB over the entire frequency range than magnetic head No. 5 fabricated with the materials having $\alpha f/\alpha s$ of 0.98.

Relating to the resistivity and the resistance to high temperatures, the permeabilities of alloys which were subjected to heat-treatment were measured as a function of the frequency.

Two kinds of soft magnetic alloys comprising $Fe_{79.1}Si_{10.8}Hf_{3.9}C_{6.2}$ with a resistivity of 128 μΩcm and $Fe_{79.6}Hf_{7.2}C_{13.2}$ with a resistivity of 30 μΩcm, respectively, were evaluated. In this evaluation, permeabilities μ relative to respective values at a frequency of 0.5 MHz were measured as a function of the frequency. The permeability of the $Fe_{79.1}Si_{10.8}Hf_{3.9}C_{6.2}$ alloy film at 0.5 MHz was 3900, and that of the $Fe_{79.6}Hf_{7.2}C_{13.2}$ alloy film was 1210.

Figure 14:
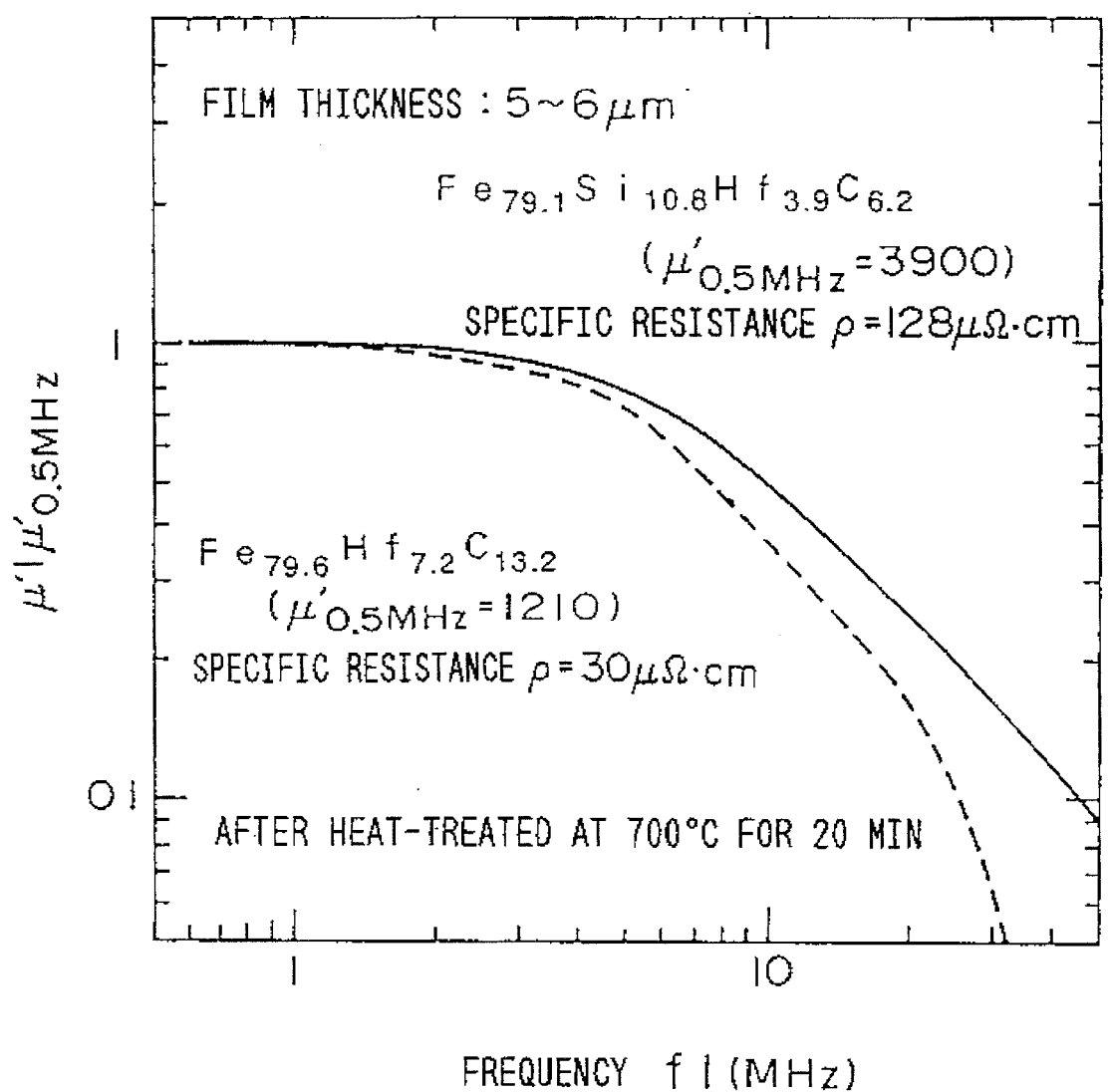
FIG. 14 is a graph illustrating the initial permeability of a soft magnetic alloy as a function of frequency wherein the initial permeability is normalized to the value at 0.5 MHz.

In conventional soft magnetic alloys comprising fine crystal grains, if the alloys are subjected to heat-treatment, their permeabilities decrease especially in a high frequency range. However, as can be seen clearly from FIG. 14, the soft magnetic alloy having a resistivity of 128 μΩcm according to the present embodiment of the invention shows a smaller reduction in permeability in the high frequency range than the alloy having a resistivity of 30 μΩcm.

This means that the soft magnetic alloy film according to the present embodiment of the invention has excellent resistance to high temperatures, that is, only very slight degradation in soft magnetic characteristics occurs due to heat-treatment at a temperature higher than 700° C.

Furthermore, the above-described samples Nos. 14 and 19 as well as sample No. 1 prepared for comparison were subjected to heat-treatment at 720° C. for 20 min, and then permeabilities and coercive force of these samples were measured. In this evaluation, each soft magnetic alloy was deposited on a substrate which were adapted to satisfy the condition $\alpha f \div \alpha s$ so as to reduce the influence of the substrate. The evaluation results are shown in Table 10.

TABLE 10

| Sample No. | Film Composition (atm %) | μ (at 1 MHz) | Hc (Oe) |
| --- | --- | --- | --- |
| 14' | $Fe_{79.9}Si_{9.3}Ta_{4.8}C_{6.0}$ | 4700 | 0.20 |
| 19' | $Fe_{75.3}Si_{12.4}Al_{4.3}Hf_{3.0}C_{5.0}$ | 5600 | 0.16 |
| 1' | $Fe_{79.6}Ta_{10.0}C_{10.4}$ | 800 | 1.8 |

From Table 10, it can be seen that the soft magnetic alloys (No. 14' and 19') according to the present embodiment of the invention can provide a sufficiently high permeability and low coercive force even after the heat-treatment at a temperature as high as 720° C. In contrast, the alloy (No. 1') prepared for comparison shows a reduction in permeability and an increase in coercive force.

Thus, it can be concluded that the soft magnetic alloy according to the present embodiment of the invention can withstand heat-treatment at a higher temperature, and thus laminate glass having a higher melting point can be employed. For example, borosilicate glass having a melting point higher than about 700° C. can be used.

A magnetic head was fabricated using borosilicate glass having a high melting point as laminate glass, while magnetic heads for comparison were also fabricated using conventional crystallized glass and lead glass, and production yields were evaluated. In the above fabrication process, gap bonding was carried out at 550° C.

The results are shown in Table 11.

TABLE 11

| Laminate Glass | Laminating Temperature | Gap Bonding Temperature | Yield |
| --- | --- | --- | --- |
| Borosilicate Glass | 720° C. | 550° C. | 95% |
| Crystallized Glass | 600° C. | 550° C. | 60% |
| Lead Glass | 660° C. | 550° C. | 50% |

As can be seen from Table 11, in the conventional magnetic heads fabricated using crystallized glass or lead glass as the laminate glass, since there is only a small difference between the softening point of the laminate glass and the gap bonding temperature, the laminate glass becomes soft when the gap bonding is carried out, and thus position shift in the magnetic core occurs. This causes a large number of defective products, and thus causes a low production yield and low production reliability.

In contrast, in the magnetic head fabricated using borosilicate glass as the laminate glass according to the present embodiment of the invention, since there is a sufficiently large difference between the softening point of the laminate glass and the gap bonding temperature, the laminate glass does not easily become soft when the gap bonding is carried out, and thus it is possible to achieve great improvement in yield and production reliability.

As described above, in the magnetic head comprising a magnetic film deposited on a substrate according to the present invention, the coefficient of linear thermal expansion, saturation magnetostriction constant, and mean crystal grain size of the magnetic film forming a magnetic core, and the coefficient of linear thermal expansion of a substrate on which the magnetic film is deposited or a substrate which is placed on the magnetic film are all specified so that strain arising during the production process of the magnetic head is suppressed thereby producing the magnetic head having the magnetic core with a high permeability and low coercive force.

Furthermore, the ratio of the coefficient of linear thermal expansion of the magnetic film to that of the substrate is limited in the range from 1 to 1.3 so that the strain is further suppressed thereby achieving a high permeability and low coercive force.

A soft magnetic alloy having excellent resistance to high temperatures is used as the magnetic film. This allows the use of laminate glass having such a high melting point that could not employed in conventional techniques. Thus, it becomes possible to have a sufficiently large difference between the melting point of the laminate glass and the melting point of the gap glass to prevent the laminate glass from becoming soft during the gap bonding process. As a result, the position shift of the magnetic core is avoided, and the production reliability of the magnetic head is improved.

Furthermore, in the magnetic head according to the present invention, its magnetic film has excellent resistance to corrosion, while maintaining excellent soft magnetic characteristics such as a high permeability and low coercive force. A narrower track width can be achieved in the magnetic head, thereby improving the recording density. A high production yield and high production reliability are also achieved.

What is claimed is:

1. A magnetic head including a magnetic film deposited on a substrate,
    wherein said magnetic film comprises a soft magnetic alloy having a resistivity greater than 120 μΩcm, an average coefficient of linear thermal expansion αf in the range from $125\times10^{-7}$ to $150\times10^{-7}/°C$. over the temperature range from room temperature to 600° C., a saturation magnetostriction that is constant in the range from 0 to $+3\times10^{-6}$, and a mean crystal grain size less than 30 nm;

wherein a portion of said substrate adjacent to the magnetic core has an average coefficient of linear thermal expansion $\alpha s$ in the range from $115\times10^{-7}$ to $145\times10^{-7}/°C$. over the temperature range from room temperature to 600° C., wherein the coefficient of linear thermal expansion $\alpha f$ of said soft magnetic alloy and the coefficient of linear thermal expansion $\alpha s$ of said substrate satisfy the following inequality $1 \leq \alpha f/\alpha s \leq 1.3$;

wherein said soft magnetic alloy consists essentially of:
$Fe—X_a—M_b—Z_c—T_d$, where X is selected from the group consisting of Si and Al;

M is at least one metal selected from the group of metals consisting of Zr, Hf, Nb, and Ta;

Z is selected from the group consisting of C and N; and

T is at least one metal selected from the group consisting of Cr, Ti, Mo, W, V, Re, Ru, Rh, Ni, Co, Pd, Pt, and Au; and furthermore:

$0.5 \leq a \leq 25$ (atm %)

$1 \leq b \leq 10$ (atm %)

$0.5 \leq c \leq 15$ (atm %)

$0 \leq d \leq 10$ (atm %); and wherein the other part consists of Fe.

2. The magnetic head of claim 1, wherein $\alpha f$ and $\alpha s$ satisfy the inequality $1.1 \leq \alpha f/\alpha s \leq 1.3$.

3. The magnetic head of claim 1, wherein said soft magnetic alloy includes carbide of metal selected from metal group M.

4. The magnetic head of claim 1, wherein said soft magnetic alloy includes nitride of metal selected from metal group M.

5. A magnetic head including a magnetic film deposited on a substrate, wherein said magnetic film comprises a soft magnetic alloy having a resistivity greater than 120 $\mu\Omega cm$, an average coefficient of linear thermal $\alpha f$ expansion in the range from $125\times10^{-7}$ to $150\times10^{-7}/°C$. over the temperature range from room temperature to 600° C., a saturation magnetostriction constant in the range from 0 to $3\times10^{-6}$, and a mean crystal grain size less than 30 nm;

wherein the portion of said substrate adjacent to the magnetic core has an average coefficient of linear thermal expansion $\alpha s$ in the range from $115\times10^{-7}$ to $145\times10^{-7}/°C$. over the temperature range from room temperature to 600° C.;

wherein $\alpha f$ and $\alpha s$ satisfy the inequality $1 \leq \alpha f/\alpha s \leq 1.3$;

wherein said soft magnetic alloy consists essentially of:

$Fe—Si_e—Al_f—M_b—Z_c—T_d$ where X is at least one metal selected from the group of metals consisting of Zr, Hf, Nb, and Ta; Z is selected from the group consisting of C and N; T is at least one metal selected from the group consisting of Cr, Ti, Mo, W, V, Re, Ru, Rh, Ni, Co, Pd, Pt, and Au; and furthermore:

$8 \leq f \leq 15$ (atm %)

$0.5 \leq f \leq 10$ (atm %)

$1 \leq b \leq 10$ (atm %)

$0.5 \leq c \leq 15$ (atm %)

$0 \leq d \leq 10$ (atm %); and the other part consists of Fe.

6. The magnetic head of claim 5, wherein $\alpha f$ and $\alpha s$ satisfy the inequality $1.1 \leq \alpha f/\alpha s \leq 1.3$.

7. The magnetic head of claim 5, wherein said magnetic film is made of soft magnetic alloy including nitride of metal selected from metal group M.

8. The magnetic head of claim 5, wherein said magnetic film is made of soft magnetic alloy including carbide of metal selected from metal group M.

* * * * *